US011654779B2

(12) United States Patent
Isami et al.

(10) Patent No.: US 11,654,779 B2
(45) Date of Patent: May 23, 2023

(54) VIRTUAL MANUAL TRANSMISSION SYSTEM FOR ELECTRIC VEHICLE

(71) Applicant: TOYOTA JIDOSHA KABUSHIKI KAISHA, Toyota (JP)

(72) Inventors: Yoichiro Isami, Mishima (JP); Hiroyuki Amano, Susono (JP); Takayuki Oshima, Susono (JP); Makoto Takano, Sunto-gun (JP); Yuta Tsukada, Sunto-gun (JP); Kiyosuke Hayamizu, Susono (JP); Hiroaki Kodera, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/861,434

(22) Filed: Jul. 11, 2022

(65) Prior Publication Data

US 2023/0039347 A1 Feb. 9, 2023

(30) Foreign Application Priority Data

Aug. 4, 2021 (JP) .............................. JP2021-128166

(51) Int. Cl.
*B60L 15/20* (2006.01)
*B60L 3/00* (2019.01)
(Continued)

(52) U.S. Cl.
CPC ............. *B60L 15/20* (2013.01); *B60L 3/0046* (2013.01); *B60L 3/0061* (2013.01);
(Continued)

(58) Field of Classification Search
CPC ...... B60L 15/20; B60L 3/0046; B60L 3/0061; B60L 2240/421; B60L 2240/486; F16H 59/02; F16H 61/0213; F16H 2059/0221
See application file for complete search history.

(56) References Cited

U.S. PATENT DOCUMENTS

2011/0087395 A1* 4/2011 Yamamoto ............ B60W 10/26
701/22
2013/0325236 A1* 12/2013 Endo ..................... B60W 10/06
903/903
(Continued)

FOREIGN PATENT DOCUMENTS

CN 109291804 A 2/2019
CN 110920414 A * 3/2020 .............. B60L 15/20
(Continued)

OTHER PUBLICATIONS

Machine translation of CN 110920414A filed Nov. 18, 2022. (Year: 2022).*
(Continued)

*Primary Examiner* — Tisha D Lewis
(74) *Attorney, Agent, or Firm* — Oliff PLC

(57) ABSTRACT

A virtual manual transmission system for an electric vehicle for simulating the behavior of a vehicle having a manual transmission by controlling a motor while protecting an electric storage device. A controller is configured to: change torque of the motor when a virtual manual shifting is executed by operating a clutch device, an accelerator device, and a shifting device; and reduce a regulation on a change rate of the torque of the motor or an input/output power to/from the electric storage device.

5 Claims, 4 Drawing Sheets

(51) Int. Cl.
B60L 3/04 (2006.01)
B60W 30/182 (2020.01)
F16H 59/02 (2006.01)
F16H 61/02 (2006.01)

(52) U.S. Cl.
CPC .......... B60W 30/182 (2013.01); F16H 59/02 (2013.01); F16H 61/0213 (2013.01); *B60L 2240/421* (2013.01); *B60L 2240/486* (2013.01); *F16H 2059/0221* (2013.01)

(56) References Cited

U.S. PATENT DOCUMENTS

2018/0141535 A1* 5/2018 Yoshioka .............. B60W 20/00
2021/0229550 A1 7/2021 Isami

FOREIGN PATENT DOCUMENTS

| JP | 2011-020542 A | 2/2011 | |
|---|---|---|---|
| JP | 2011-215436 A | 10/2011 | |
| JP | 6787507 B1 | 11/2020 | |
| WO | WO-2020025860 A1 * | 2/2020 | ............. B60L 15/20 |
| WO | 2020/095280 A1 | 5/2020 | |

OTHER PUBLICATIONS

Jan. 2, 2023 Extended European Search Report issued in European Patent Application No. 22188780.5.

\* cited by examiner

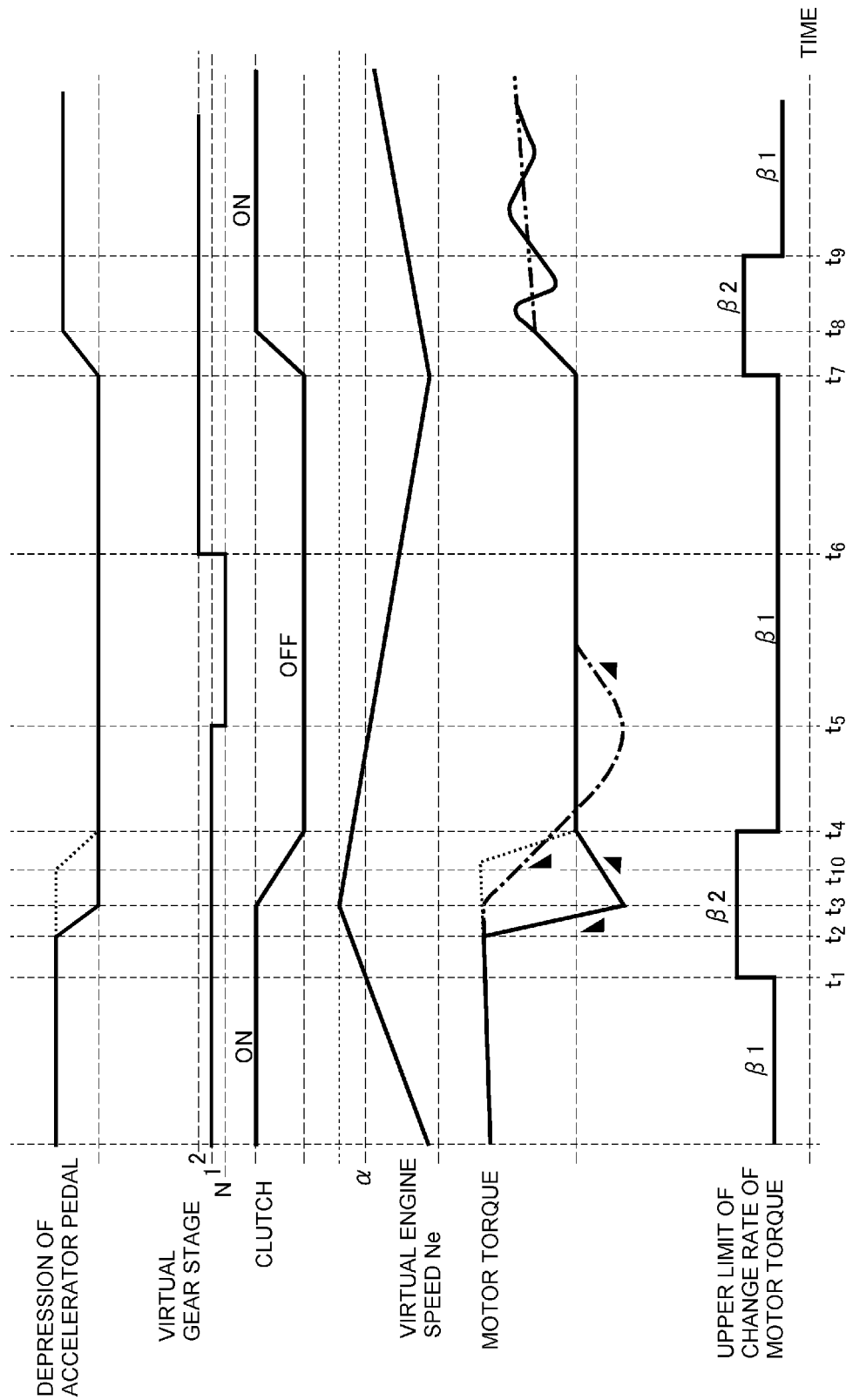

VIRTUAL MANUAL TRANSMISSION SYSTEM FOR ELECTRIC VEHICLE

CROSS-REFERENCE TO RELATED APPLICATIONS

The present disclosure claims the benefit of Japanese Patent Application No. 2021-128166 filed on Aug. 4, 2021 with the Japanese Patent Office.

BACKGROUND

Field of the Invention

Embodiments of the present disclosure relate to the art of a control system for an electric vehicle configured to simulate behavior of conventional vehicles having manual transmissions.

Discussion of the Related Art

JP-B2-6787507 describes one example of an electric vehicle having the above-mentioned function. The electric vehicle described in JP-B2-6787507 comprises a shift device that is operated by a driver to select a mode from a plurality of modes in which torque characteristics of an electric motor differ stepwise, and a clutch device that simulates an operation of a conventional clutch mechanism for selectively transmitting torque between a prime mover and drive wheels. In the electric vehicle described in JP-B2-6787507, torque of the electric motor is controlled based on a signal including the mode selected by the shift device and a signal including an operation amount of the clutch device. According to the teachings of JP-B2-6787507, specifically, the torque transmitted from the motor to the drive wheels is reduced in accordance with an increase in an operating amount of the clutch device corresponding to a depression of the conventional clutch pedal, and increased in accordance with a reduction in an operating amount of the clutch device and the selected mode.

However, if the torque is changed significantly when engaging the clutch while increasing the torque transmitted through the clutch, a shock would be generated. By contrast, if the torque is changed too slowly in the above-mentioned situation, a response to a shifting operation and an acceleration response would be reduced. In order to avoid such disadvantage, for example, a control device described in JP-A-2011-20542 is configured to control a change rate of a motor torque. Specifically, in a case of increasing a transmission torque when a friction element engaged partially while slipping is engaged completely, the control device described in JP-A-2011-20542 controls a change rate of a torque of a motor serving as a prime mover based on a change in the transmission torque and a requested driving torque.

In the electric vehicle, the motor as a prime mover generates a driving torque when serving as a motor, and generates a braking torque when regenerating energy. Because of such versatility of an output torque of the motor, as described in JP-B2-6787507, it is possible to simulate the behavior of the conventional vehicle having a manual transmission by the electric vehicle. In the electric vehicle, the motor is connected to an electric storage device including a secondary battery so that electricity is supplied repeatedly from the electric storage device to the motor and the electric storage device is charged repeatedly so as to simulate the behavior of the vehicle having the manual transmission. As a result of repeating charge and discharge, the electric storage device will be heated and properties of electrolyte will be changed thereby damaging the electric storage device. In the conventional art, therefore, charge and discharge of the electric storage device is restricted to protect the electric storage device.

A manual shifting operation is executed to change the behavior or a driving torque) of the vehicle in line with the driver's intention. To this end, it is preferable to execute the manual shifting operation promptly, and to change the driving torque and the braking torque promptly in response to the manual shifting operation. In order to simulate the behavior of the vehicle having the manual transmission, therefore, it is necessary to change the driving torque and the braking torque of the motor significantly. That is, it is necessary to discharge a large amount of electricity from the electric storage device, and to charge the electric storage device with a large amount of electricity. However, as described, charge and discharge of the electric storage device is restricted to protect the electric storage device. Therefore, when the electric vehicle simulates the behavior of the vehicle having the manual transmission, a required amount of electricity may not be discharged from the electric storage device, and the electric storage device may not be charged with a required amount of electricity. In those cases, the electric vehicle may not simulate the behavior of the vehicle having the manual transmission intended by the driver. Thus, it is required to allow the electric vehicle to simulate or imitate the behavior of the conventional vehicle having the manual transmission while protecting the electric storage device by restricting charge and discharge of the electric storage device.

SUMMARY

Aspects of embodiments of the present disclosure have been conceived noting the foregoing technical problems, and it is therefore an object of the present disclosure to provide a virtual manual transmission system for an electric vehicle that is configured to simulate the behavior of a vehicle having a manual transmission by controlling a motor while protecting an electric storage device.

According to the exemplary embodiment of the present disclosure, there is provided a virtual manual transmission system for an electric vehicle comprising: an electric motor that serves as a prime mover; an accelerator device that is operated by a driver to control an output torque of the electric motor; an electric storage device that is connected to the electric motor; a clutch device that is operated by the driver to transmit a torque between the electric motor and a pair of drive wheels, and to interrupt torque transmission between the electric motor and the drive wheels; and a shifting device that is operated by the driver to select a mode determining a relation between the output torque of the electric motor and a driving torque delivered to the drive wheels. In the electric vehicle, at least one of a change rate of the output torque of the electric motor and an input/output power to/from the electric storage device may be regulated. In order to achieve the above-explained objective, according to the exemplary embodiment of the present disclosure, the virtual manual transmission system is provided with a controller that controls the output torque of the electric motor. Specifically, the controller is configured to: change the output torque of the electric motor based on a detection signal representing an execution of a virtual manual shifting including an operation of the clutch device to allow or interrupt torque transmission between the electric motor and the drive wheels, an operation of the accelerator device to change the output torque of the electric motor executed in connection with the operation of the clutch device, and an operation of the shifting device to select the mode; and change an upper limit value of the at least one of the change rate of the output torque of the electric motor and the input/output power to/from the electric storage device, so as to reduce a regulation on the change rate of the output torque of the electric motor or the input/output power to/from the electric storage device.

In a non-limiting embodiment, the controller may be further configured to reduce the regulation when the clutch device is operated to interrupt torque transmission between the electric motor and the drive wheels, or to allow torque transmission between the electric motor and the drive wheels.

In a non-limiting embodiment, the controller may be further configured to reduce the regulation for a predetermined period of time after completion of the operation of the clutch device to interrupt torque transmission between the electric motor and the drive wheels, or to allow torque transmission between the electric motor and the drive wheels.

In a non-limiting embodiment, a numerical model of a model vehicle having a transmission in which a speed ratio is changed by operating a shifting device and an engine connected to the transmission may be stored in the controller. In addition, the controller may be further configured to: calculate a virtual engine speed based on an expected speed ratio of the transmission of the model vehicle and a rotational speed of a predetermined rotary member corresponding to a speed of the electric vehicle; and reduce the regulation when the virtual engine speed is equal to a reference speed or higher.

In a non-limiting embodiment, the controller may be further configured to: determine a satisfaction of a condition to protect the electric motor or the electric storage device; and restrict reduction of the regulation upon satisfaction of the condition to protect the electric motor or the electric storage device.

In a non-limiting embodiment, the controller may be further configured to change the upper limit value to reduce the regulation on a preferential basis in a case of operating the clutch device to interrupt torque transmission between the electric motor and the drive wheels, compared to a case of operating the clutch device to allow torque transmission between the electric motor and the drive wheels.

Thus, according to the exemplary embodiment of the present disclosure, the output torque of the motor is controlled to imitate the behavior of the model vehicle during execution of the virtual manual shifting in the electric vehicle. If the input/output power to/from the electric storage device exceeds the upper limit value during execution of the virtual manual shifting, the upper limit value of the input/output power is changed to reduce the regulation on the input/output power. According to the exemplary embodiment of the present disclosure, therefore, the motor is allowed to change the output torque thereof sufficiently to imitate the behavior of the model vehicle during execution of the virtual manual shifting. However, the clutch device and the shifting device are operated only for a short period of time during execution of the virtual manual shifting, and the regulation on the input/output power to/from the electric storage device is reduced only during execution of the virtual manual shifting. For these reasons, the load on the electric storage device is not especially increased, and hence the electric storage device will not be damaged. According to the exemplary embodiment of the present disclosure, therefore, the electric vehicle is allowed to imitate the behavior of the model vehicle during execution of the virtual manual shifting, while protecting the electric storage device.

In addition, in the case that the condition to protect the motor and the electric storage device is satisfied, the reduction in the regulation on the change rate of the output torque of the motor or the input/output power to/from the electric storage device is restricted. strongly in a case of operating the clutch device to allow torque transmission between the electric motor and the drive wheels, compared to a case of operating the clutch device to interrupt torque transmission between the electric motor and the drive wheels. In other words, the regulation on the change rate of the output torque of the motor or the input/output power to/from the electric storage device is reduced on a preferential basis in the case of operating the clutch device to interrupt torque transmission between the electric motor and the drive wheels, compared to the case of operating the clutch device to allow torque transmission between the electric motor and the drive wheels. According to the exemplary embodiment of the present disclosure, therefore, the electric vehicle may be prevented from moving unintentionally while the torque transmission between the electric motor and the drive wheels is interrupted. For this reason, the electric vehicle is allowed to imitate the behavior of the model vehicle during execution of the virtual manual shifting precisely as intended by the driver.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIG. 4 is a time chart showing a temporal change in an output torque of the motor and a regulation level to protect the electric storage device during execution of the virtual manual shifting.

DETAILED DESCRIPTION OF THE PREFERRED EMBODIMENT(S)

Embodiments of the present disclosure will now be explained with reference to the accompanying drawings. Note that the embodiments shown below are merely examples of the present disclosure which should not limit a scope of the present disclosure.

Figure 1:
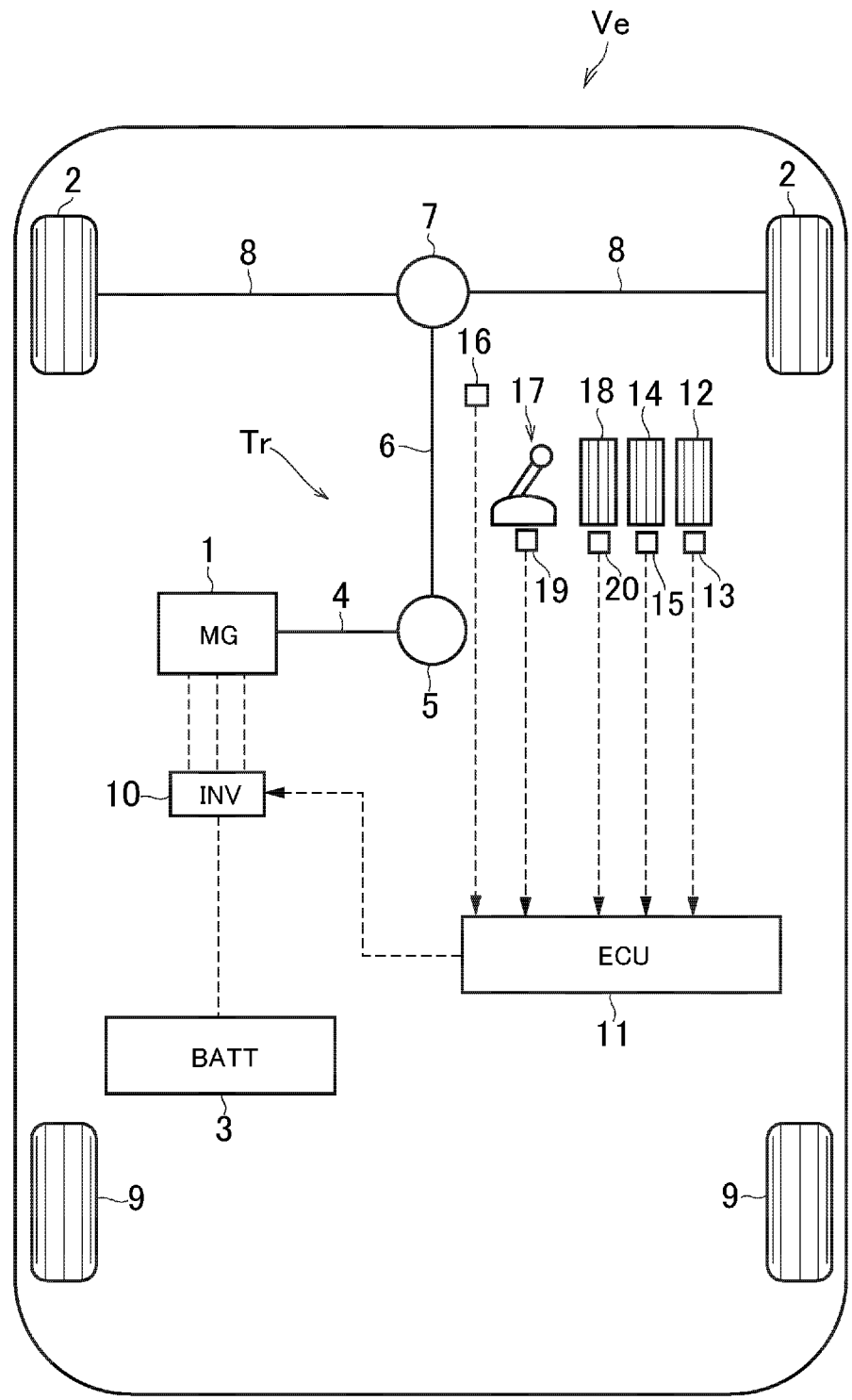
FIG. 1 is a schematic illustration showing a structure of a vehicle to which the virtual manual transmission system according to the exemplary embodiment of the present disclosure is applied.

Referring now to FIG. 1, there is shown one example of a structure of an electric vehicle (hereinafter simply called a vehicle) Ve to which the virtual manual transmission system according to the embodiment of the present disclosure is applied. The vehicle Ve shown. in FIG. 1 is a front drive layout electric vehicle propelled by delivering an output torque of a motor (referred to as "MG" in FIG. 1) 1 as a prime mover to a pair of front wheels 2. According to the exemplary embodiment of the present disclosure, a motor/generator that serves not only as a motor but also as a generator is adopted as the motor 1. Specifically, the motor 1 serves as a motor to generate a driving torque to propel the vehicle Ve by supplying electric power to the motor 1 from an electric storage device (referred to as "BATT" in FIG. 1) 3. The motor 1 also serves as a generator to generate electric power when rotated. passively by a torque delivered thereto. For example, a synchronous motor and an induction motor may be adopted as the motor 1.

An output shaft 4 of the motor 1 is connected to one end of a propeller shaft 6 through a gear unit 5, and the other end of the propeller shaft 6 is connected to a differential gear unit 7. That is, the output torque of the motor 1 is distributed to right and left driveshafts 8 through the differential gear unit 7, and further distributed to the front wheels 2 through the drive shafts 8. Instead, the virtual manual transmission system according to the exemplary embodiment of the present disclosure may also be applied to a rear-drive layout electric vehicle in which the output torque of the motor 1 is delivered to a pair of rear wheels 9, or a four-wheel-drive layout electric vehicle in which the output torque of the motor 1 is distributed to the front wheels 2 and the rear wheels 9 through a transfer.

The motor 1 is provided with an inverter (referred to as "INV" in FIG. 1) 10 so that a magnitude and a frequency of electric current supplied to each phase of the motor 1 are controlled by the inverter 10, and the inverter 10 is connected to an electric storage device (referred to as "BATT" in FIG. 1) 3 that discharges a direct current. As an option, an auxiliary such as a converter may be arranged to boost a voltage of electric power supplied from the electric storage device 3. In addition, the electric storage device 3 may include a secondary battery such as a lithium-ion battery and an electronic component such as a capacitor.

In order to control e.g., switch elements of the inverter 10, the vehicle Ve is provided with an electronic control unit (to be abbreviated as the "ECU" hereinafter) 11 as a controller. The ECU 11 comprises a microcomputer as its main constituent configured to perform calculation based on incident data from sensors and formulas as well as maps install in advance, and to transmit calculation results in the form of command signals to e.g., the inverter 10.

The vehicle Ve comprises: an accelerator pedal 12 that is manipulated by a driver to accelerate and decelerate the vehicle Ve by changing an output torque of the motor 1; an accelerator sensor 13 that detects a depression (i.e., a position) of the accelerator pedal 12 and a pedal force applied to the accelerator pedal 12; a brake pedal 14 that is manipulated by the driver to decelerate and stop the vehicle Ve; a brake sensor 15 that detects a depression of the brake pedal 14 and a pedal force applied to the brake pedal 14; and a vehicle speed sensor 16 as a rotational speed sensor that detects a rotational speed of the propeller shaft 6. Those sensors 13, 15, and 16 are connected to the ECU 11 so that data collected by the sensors 13, 15, and 16 are sent to the ECU 11 in the form of detection signal. Thus, in the vehicle Ve according to the exemplary embodiment of the present disclosure, an accelerator device comprises the accelerator pedal 12 and the accelerator sensor 13.

The vehicle Ve is provided with devices for simulating or imitating the behaviors of conventional vehicles having a manual transmission (referred to as "manual transmission vehicle" hereinafter). For example, the vehicle Ve is provided with a shifting device 1 including a shift lever and a paddle switch. Specifically, the shifting device 17 is operated to shift a virtual gear stage among a plurality of forward stages, a reverse stage, and a neutral stage. During manual shifting in the manual transmission vehicle, a torque transmission between an engine and drive wheels is temporarily interrupted to engage and disengage predetermined gear pairs, and to reduce a shift shock. To this end, a clutch is disengaged by depressing a clutch pedal and engaged by returning the clutch pedal. In order to allow the driver to execute such manual shifting operation virtually, the vehicle Ve is further provided with: a clutch pedal 18; a shift position sensor 19 that detects a position of the shifting device 17 or a virtual gear stage (or mode) selected by operating the shifting device 17; and a clutch position sensor 20 that detects a depression of the clutch pedal 18. Those sensors 19, and 20 are also connected to the ECU 11 so that data collected by the sensors 19, and 20 are also sent to the ECU 11 in the form of detection signal. Thus, in the vehicle Ve according to the exemplary embodiment of the present disclosure, a clutch device comprises the clutch pedal 18 and the clutch position sensor 20.

An operating mode of the vehicle Ve may be selected from an EV (i.e., electric vehicle) mode and a virtual manual mode. In the EV mode, an output torque of the motor 1 is controlled to propel and decelerate the vehicle Ve based on a position of the accelerator pedal 12 representing a drive demand Whereas, in the virtual manual mode, the vehicle Ve is operated while simulating the behavior of the manual transmission vehicle. For example, the electric vehicle is allowed to imitate the behavior of the manual transmission vehicle by the procedures described in JP-B2-6787507. The procedures to imitate the behavior of the manual transmission vehicle will be explained briefly hereinafter.

Figure 2:
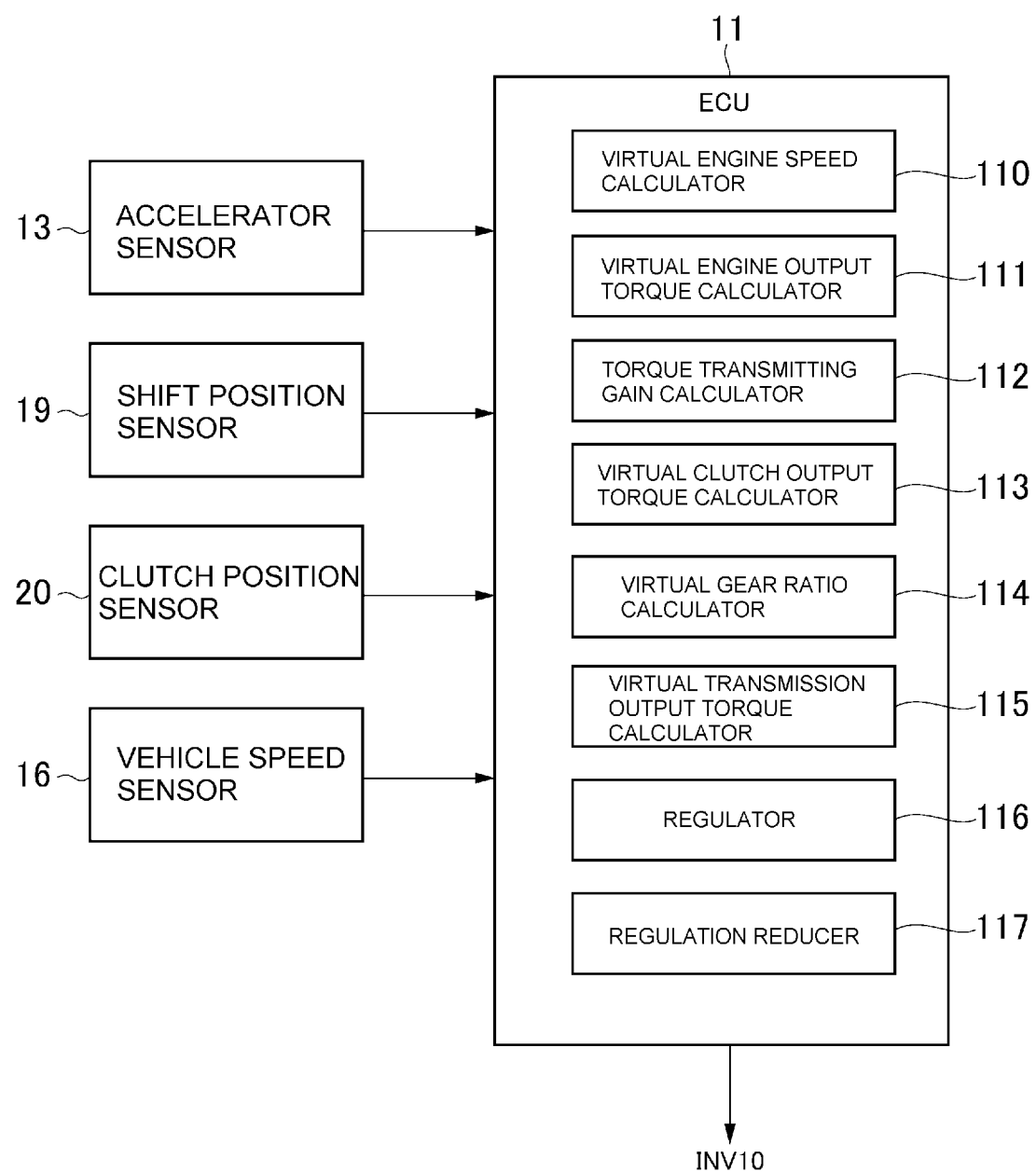
FIG. 2 is a block diagram showing a structure of an electronic control unit that controls a torque of a motor.

First of all, specifications of the manual transmission vehicle selected as a model vehicle are numerically modeled and stored in the ECU 11, In order to simulate the behavior of the model vehicle, an expected behavior of the model vehicle based on a current running condition of the vehicle Ve is computed by the ECU 11 based on: an actual depression (or position) of the accelerator pedal 12 detected by the accelerator sensor 13; a position of the shifting device 17 detected by shift position sensor 19; an actual depression of the clutch pedal 18 detected by the clutch position sensor 20; and an actual rotational speed of the propeller shaft 6 detected by the vehicle speed sensor 16. Then, the ECU 11 calculates a target output torque of the motor 1 (including a driving torque and a braking torque) to actualize the expected behavior of the model vehicle, and controls the inverter 10 to allow the motor 1 to generate the target output torque. To this end, specifically, a virtual engine speed of the model vehicle is calculated based on the data collected by the above-mentioned sensors 13, 19, 20, and 16 on the basis that the model vehicle has a geared transmission connected to an output shaft of an engine. For example, the virtual engine speed may be calculated by multiplying the rotational speed of the propeller shaft 6 detected by the vehicle speed sensor 16: by a speed ratio of the virtual gear stage selected by the shifting device 17; and by a slip ratio corresponding to the depression of the clutch pedal 18 detected by the clutch position sensor 20. Turning to FIG. 2, there are shown functional devices of the ECU 11 to simulate the behavior of the model vehicle. As illustrated in FIG. 2, in order to calculate the virtual engine speed, the ECU 11 is provided with a virtual engine speed calculator 110.

A displacement, a relation between a speed and an output torque, an efficiency and so on of the engine of the model vehicle are numerically modeled. Therefore, a virtual engine output torque of the model vehicle may be calculated based on the calculated virtual engine speed and the detected position of the accelerator pedal 12, while with reference to a map determining a relation between a speed and an output torque of the engine of the model vehicle. Specifically, the virtual engine output torque is calculated by a virtual engine output torque calculator 111 of the ECU 11.

The behavior of the model vehicle is simulated on the basis that a friction clutch in which a torque transmitting capacity varies continuously is employed in the model vehicle. In order to simulate the behavior of the model vehicle, a relation between a depression of the clutch pedal 18 and a virtual torque transmitting capacity of the friction clutch of the model vehicle is determined in the form of a map, and such map is stored in the ECU 11. For example, the map is prepared in such a manner that a gain of the virtual torque transmitting capacity varies between 0 and 1. Specifically, the gain of the virtual torque transmitting capacity is maintained to 1 as long as the depression of the clutch pedal 18 falls within a range from 0 to a predetermined angle, and reduced linearly or proportionally from 1 with an increase in the depression of the clutch pedal 18 from the predetermined angle. That is, a virtual clutch output torque of the model vehicle is governed by the above-mentioned gain, which is calculated based on an actual depression of the clutch pedal 18 detected by the clutch position sensor 20 while with reference to the above-mentioned map. Specifically, the gain of the virtual torque transmitting capacity is calculated by a torque transmitting gain calculator 112 of the ECU 11.

As described, a manual transmission vehicle having a manual transmission is selected as the model vehicle. In the model vehicle, therefore, an output torque of the engine is supposed to be changed in accordance with the above-explained gain of the torque transmitting capacity of the clutch, and the output torque of the engine is supposed to be delivered from the clutch to the manual transmission. Accordingly, the output torque of the clutch of the model vehicle may be simulated by multiplying the virtual engine output torque calculated by the virtual engine output torque calculator 111 by the gain calculated by the torque transmitting gain calculator 112. Specifically, the output torque of the clutch of the model vehicle is simulated as a virtual clutch output torque by a virtual clutch output torque calculator 113 of the ECU 11.

A virtual gear ratio (i.e., a virtual speed ratio) of the manual transmission of the model vehicle is simulated on the basis of current running conditions of the vehicle Ve. According to the embodiment of the present disclosure, the virtual gear ratio of the manual transmission is simulated as a ratio between the virtual engine speed and a virtual output speed of the manual transmission (i.e., a rotational speed of a propeller shaft) of the model vehicle. That is, the virtual gear ratio of the manual transmission may be calculated by dividing the virtual engine speed by a rotational speed of the propeller shaft 6 detected by the vehicle speed sensor 16. Specifically, the virtual gear ratio of the manual transmission is calculated by a virtual gear ratio calculator 114 of the ECU 11.

In order to simulate or imitate the behavior of the model vehicle, it is necessary to control the output torque of the motor 1 in line with a change in the virtual output torque of the manual transmission of the model vehicle. To this end, the virtual output torque of the manual transmission of the model vehicle is calculated by a virtual transmission output torque calculator 115 of the ECU 11. In the model vehicle, the torque delivered to the manual transmission is changed in accordance with the speed ratio of the manual transmission, and further delivered from the manual transmission. Therefore, the virtual output torque of the manual transmission may be calculated by multiplying the virtual clutch output torque supposed to be delivered to the manual transmission by the speed ratio of the manual transmission. As described, the virtual clutch output torque is governed by the gain calculated by the torque transmitting gain calculator 112. That is, the virtual clutch output torque is changed in accordance with the virtual torque transmitting capacity being changed to simulate an intermittence of torque transmission through the clutch during manual shifting. In order to allow the vehicle Ve to simulate the behavior of the model vehicle during execution of the virtual manual shifting, the ECU 11 controls the inverter 10 in such a mariner as to generate the virtual output torque (corresponding to a torque of the propeller shaft 6) calculated by the virtual transmission output torque calculator 115.

Nonetheless, during manual shifting in the model vehicle, the output torque of the manual transmission is changed significantly by: an interruption of torque transmission due to disengagement of the clutch; a commencement of torque transmission due to engagement of the clutch; and torsional behaviors of the manual transmission and the model vehicle itself due to change in the torque. Therefore, the electric storage device 3 and the inverter 10 of the vehicle Ve will be subjected to heavy loads when changing the torque of the motor 1 in line with such torque change in the model vehicle, and the electric storage device 3 would be damaged due to excessive charging and discharging.

In order to protect the electric storage device 3, the ECU 11 comprises a regulator 116 that regulates a discharge of the electric storage device 3 to the motor 1 and a charging of the electric storage device 3 by the electric power generated by the motor 1. To this end, the regulator 116 is configured to set an upper limit value (or a restriction value) of at least one of; a change rate of an available output torque of the motor 1; and an input/output power to/from the electric storage device 3. That is, the regulator 116 controls the inverter 10 in such a manner that a charging or discharging amount of the electric storage device 3, or a change rate of charging or discharging amount of the electric storage device 3 will not exceed the upper limit value. Such upper limit value is set to a value possible to protect the electric storage device 3 taking account of a specification, a condition, a deterioration, an SOC level, a temperature and so on of the electric storage device 3.

A regulation level to protect the electric storage device 3 may be categorized into: a high level to be selected to prevent the electric storage device 3 from deteriorating earlier than an expected aging deterioration in a normal condition; an intermediate level to be selected to protect the electric storage device 3 from permanent damage without taking into consideration a temporal damage; and a low level to be selected to protect the electric storage device 3 only from critical damage which might cause a malfunction of the electric storage device 3 immediately. Specifically, the above-mentioned upper limit value is set to a smallest value when the high regulation level is selected, to a largest value when the low regulation level is selected, and to an intermediate value when the intermediate regulation level is selected.

According to the exemplary embodiment of the present disclosure, the high regulation level is selected in the normal condition, and the low regulation level or the intermediate regulation level is selected upon satisfaction of a predetermined condition. Specifically, restrictions of the change rate of available output torque of the motor 1 and the input/output power to/from the electric storage device 3 set by the regulator 116 are reduced by a regulation reducer 117 upon satisfaction of a predetermined condition, when controlling the output torque of the motor 1 in line with the virtual output torque.

Figure 3:
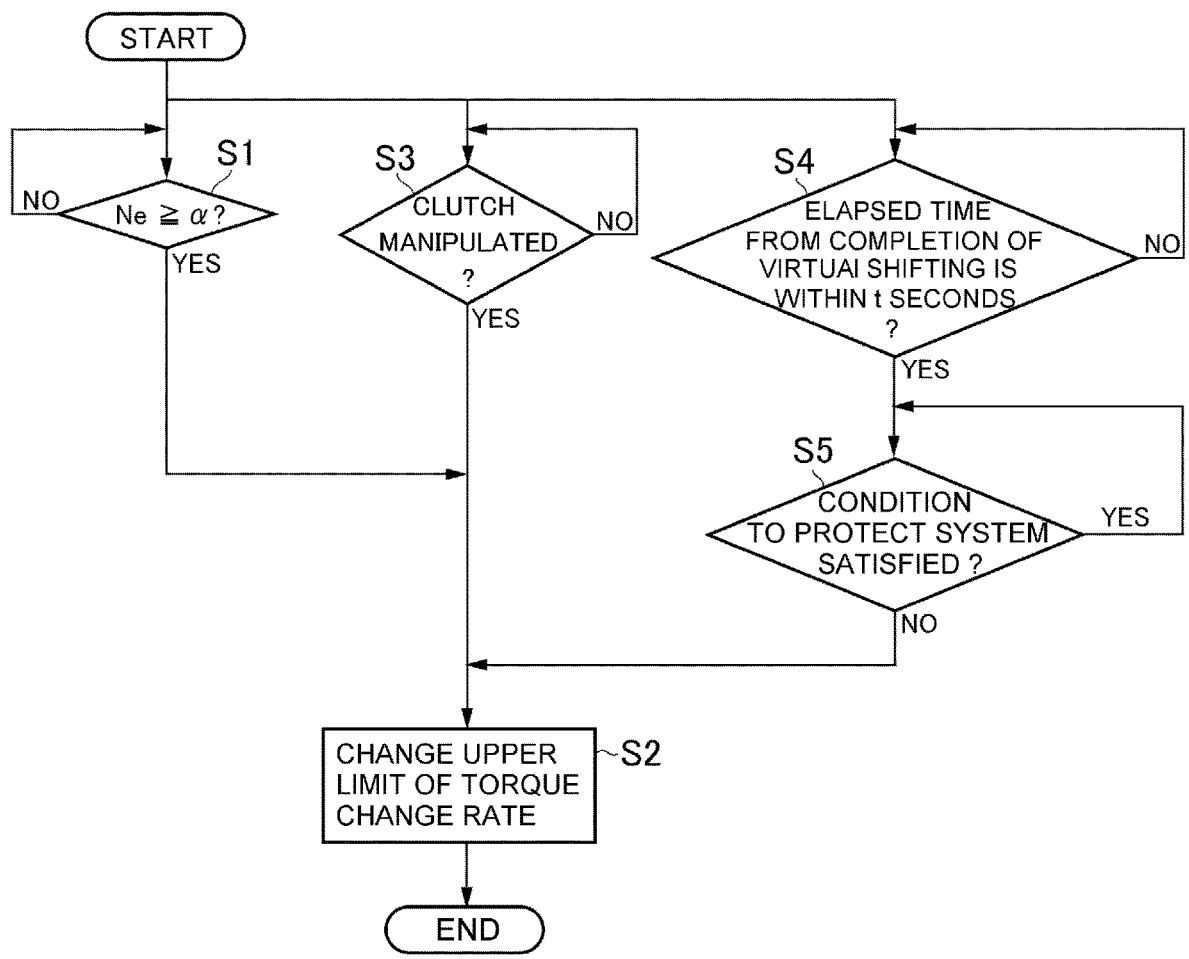
FIG. 3 is a flowchart showing one example of a routine executed by a controller.

Turning to FIG. 3, there is shown one example of a routine to change the regulation level while imitating the behavior of the model vehicle. Specifically, the routine shown in FIG. 3 is executed by the ECU 11 in a condition that the shifting device 17 and the clutch pedal 18 are activated during propulsion of the vehicle Ve. At step S1, it is determined whether a virtual engine speed Ne is equal to or higher than a reference speed α. According to the exemplary embodiment of the present disclosure, the driver is allowed to execute a virtual manual shifting during propulsion by manipulating the shifting device 17 and the clutch pedal 18, and the output torque of the motor 1 is changed in such a manner as to imitate the behavior of the model vehicle in response to an execution of the virtual manual shifting. Therefore, the reference speed α is set to determine whether the electric storage device 3 and the inverter 10 are subjected to high loads when controlling the output torque of the motor 1 to simulate the behavior of the model vehicle.

For example, in a case that the virtual engine speed Ne is high, the virtual engine speed Ne will be reduced significantly when the clutch pedal 18 is depressed. In this case, therefore, an input power and an output power to/from the electric storage device 3, and a change rate of the torque of the motor 1 will be increased to imitate the behavior of the model vehicle. That is, a load on the electric storage device 3 will be increased to control the torque of the motor 1. Such load on the electric storage device 3 changes depending on a running condition such as a speed of the vehicle Ve, therefore, the reference speed a may be changed depending on a current running condition of the vehicle Ve.

If the virtual engine speed Ne is equal to the reference speed α or higher so that the answer of step S1 is YES, the routine progresses to step S2 to increase the upper limit value of the change rate of the output torque of the motor 1, and thereafter returns. In this case, a load on the electric storage device 3 during the virtual manual shifting to be executed in the future is expected to be increased compared to that in the normal condition. That is, the load on the electric storage device 3 during the virtual manual shifting to be executed in the future is expected to exceed the upper limit value of the high regulation level set by the regulator 116. In this case, therefore, the upper limit value of the change rate of the output torque of the motor 1 is increased to enable the motor 1 to generate torque in such a manner as to imitate the behavior of the model vehicle during execution of the virtual manual shifting. In other words, the regulation of the input/output power to/from the electric storage device 3 is reduced to enable the motor 1 to generate torque in such a manner as to imitate the behavior of the model vehicle during execution of the virtual manual shifting. By contrast, if the virtual engine speed Ne is lower than the reference speed a so that the answer of step S1 is NO, it is not necessary to reduce such regulation. In this case, therefore, the routine returns to step S1 to maintain the high regulation level.

In conjunction with the determination at step S1, it is determined at step S3 whether the clutch pedal 18 is currently being manipulated. In other words, at step S3, it is determined whether a position of the clutch pedal 18 is currently being changed. Specifically, it is determined whether the clutch pedal 18 is currently being depressed to virtually interrupt torque transmission, or currently being returned to virtually start torque transmission. In the model vehicle, if the clutch is disengaged during manual shifting, the torque transmission to the drive wheels will be interrupted immediately. In the vehicle Ve, therefore, it is necessary to change the torque of the motor 1 abruptly to imitate such abrupt reduction of the transmission torque in the model vehicle. Consequently, the input/output power to/from the electric storage device 3 and the change rate of the output torque of the motor 1 will be increased thereby increasing the load on the electric storage device 3. Therefore, if the answer of step S3 is YES, the routine also progresses to step S2 to reduce the regulation of the input/output power to/from the electric storage device 3, so as to allow the motor 1 to change the output torque thereof significantly.

If the clutch is engaged in the model vehicle, the model vehicle would jolt back and forth due to increase in the driving torque. In the vehicle ye, therefore, it is necessary to change the torque of the motor 1 abruptly and repeatedly to imitate such jolting motion of the model vehicle. As a result, the load on the electric storage device 3 will also be increased. For this reason, if the clutch pedal 18 is currently being repressed or returned so that the answer of step S3 is YES, the routine also progresses to step S2 to reduce the regulation. By contrast, if the clutch pedal 18 is not currently being manipulated so that the answer of step S3 is NO, it is not necessary to reduce the regulation. In this case, therefore, the routine returns to step S3 to maintain the high regulation level.

In conjunction with the determinations at steps S1 and S3, it is determined at step S4 whether an elapsed time from a point at which the clutch pedal 18 is returned to an initial position is within t second(s). In other words, it is determined at step S4 whether an elapsed time from the completion of the virtual manual shifting is within predetermined seconds t. As a result of the completion of engagement of the clutch, the model vehicle would jolt back and forth due to generation of torsional vibrations in a torque transmission route, and such torsional vibrations would remain for a certain period of time after the completion of engagement of the clutch. In the vehicle Ve, therefore, it is necessary to change the torque of the motor 1 significantly and repeatedly after the completion of the virtual manual shifting for the period of time in which the model vehicle is supposed to jolt, so as to imitate such jolting motion of the model vehicle. That is, the load on the electric storage device 3 will be increased in the period of time in which the model vehicle is supposed to jolt. Accordingly, the predetermined seconds t is set to a period of time in which the load on the electric storage device 3 is supposed to be increased after the completion of the virtual manual shifting, in accordance with the specification of the model vehicle.

If the elapsed time from the completion of the virtual manual shifting exceeds the predetermined seconds t so that the answer of step S4 is NO, it is not necessary to reduce the regulation. In this case, therefore, the routine returns to step S4 to maintain the high regulation level. By contrast, if the elapsed time from the completion of the virtual manual shifting is still within the predetermined seconds t so that the answer of step S4 is YES, the routine progresses to step S5 to determine whether an action (or control) of a system including the motor 1, the electric storage device 3, the inverter 10, and a control system of those devices is restricted to protect the system. The above-mentioned system generates heat during operation, and is allowed to function properly at temperatures below a restrictive temperature. Therefore, if the temperature of the system is higher than the restrictive temperature, the action (or control) of the system will be restricted. In addition, the action (or control) of the system will also be restricted in the event of some failure, That is, at step S5, it is determined whether the action (or control) of the system including the motor 1 and the electric storage device 3 is restricted, and hence a condition to protect the system is satisfied. If the condition to protect the system is not satisfied so that the answer of step S5 is NO, the routine further progresses to step S2 to reduce the regulation of the input/output power to/from the electric storage device 3.

By contrast, if the condition to protect the system is satisfied so that the answer of step S5 is YES, the routine returns to step S5 to restrict the reduction of the regulation and maintain the high regulation level of the input/output power to/from the electric storage device 3. In this case, therefore, the output torque of the motor 1 may not be changed to imitate the behavior of the model vehicle during execution of the virtual manual shifting. However, although the vehicle Ve is not allowed to imitate the above-mentioned jolting motion of the model vehicle in this case, propulsion of the vehicle Ve will not be restricted by such regulation of the output torque of the motor 1. Rather, the system including the electric storage device 3 and the motor 1 may be protected effectively in this case thereby extending the lifetime of the system. Thus, according to the exemplary embodiment of the present disclosure, the regulation of the input/output power to/from the electric storage device 3 or the output torque of the motor 1 will be reduced on a preferential basis in a case of depressing the clutch pedal 18, compared to a case of returning the clutch pedal 18. According to the exemplary embodiment of the present disclosure, therefore, unintended behavior of the vehicle Ve may be reduced as much as possible during execution of the virtual manual shifting.

Turning to FIG. 4, there is shown one example of a temporal change in the output torque of the motor 1 (also referred to as motor torque) during execution of the routine shown in FIG. 3. In FIG. 4, a "virtual gear stage" (i.e., a virtual speed ratio) corresponds to a gear stage (i.e., a speed ratio) of the model vehicle, and the virtual gear stage is shifted with reference to a two-dimensional shifting map stored in the ECU 11. For example, the shifting map is configured to determine the virtual gear stage based on a speed of the vehicle Ve or a rotational speed of a predetermined rotary member such as the propeller shaft 6, and a position of the accelerator pedal 12 representing a drive demand. Specifically, the virtual speed ratio of the vehicle Ve is determined based on a position of the accelerator pedal 12 detected by the accelerator sensor 13 and a rotational speed of the propeller shaft 6 detected by the vehicle speed sensor 16 (i.e., an output speed), with reference to the shifting map.

Before point t1, the accelerator pedal 12 is maintained to predetermined position and the vehicle Ve is propelled in the first virtual gear stage. In this situation, the motor 1 is generating a driving torque in accordance with a position of the accelerator pedal 12 so that a speed of the vehicle Ve and a virtual engine speed Ne are increased gradually. That is, the vehicle Ve is propelled in the normal condition before point t1, and hence the high regulation level is selected before point t1. Therefore, before point t1, the upper limit value of a change rate of the motor torque is set to a predetermined value $\beta 1$ which is selected in the high regulation level.

The virtual engine speed Ne is raised to the above-mentioned reference speed $\alpha$ at point t1. In this situation, therefore, the routine shown in FIG. 3 progresses from step S1 to step S2 to increase the upper limit value of a change rate of the motor torque from the predetermined value $\beta 1$ to another predetermined value $\beta 2$ which is larger than $\beta 1 (\beta > \beta 1)$. That is, a regulation of a change rate of the motor torque is reduced.

When the speed of the vehicle Ve is increased to a certain level with an increase in the virtual engine speed Ne, the driver starts a virtual upshifting to the second virtual gear stage. First of all, the driver returns the accelerator pedal 12 at point t2, and eventually, the driver lifts his/her foot off the accelerator pedal 12 so that the accelerator pedal 12 is returned toward the initial position. If the accelerator pedal is returned in the model vehicle, an engine torque is reduced so that the model vehicle is decelerated. In this situation, therefore, the torque of the motor 1 is reduced significantly while generating a regenerative braking force so as to imitate such behavior of the model vehicle. Consequently, a large amount of electric power is discharged from the electric storage device 3 and inputted to the electric storage device 3. Nonetheless, the upper limit value of a change rate of the motor torque has already been increased from the predetermined value $\beta 1$ to another predetermined value $\beta 2$. Therefore, it is possible to change the torque of the motor 1 based on the virtual output torque calculated by the virtual transmission output torque calculator 115. In this situation, since the clutch pedal 18 has not yet been depressed, the virtual engine speed Ne is still increasing.

The accelerator pedal 12 is returned to the initial position and the clutch pedal 18 is depressed at point t3. If the accelerator pedal is returned to the initial position and the clutch pedal is depressed in the model vehicle, a braking force is established by the engine, and a torque transmitting capacity of the clutch is reduced with a depression of the clutch pedal. In this situation, specifically, the model vehicle is decelerated by the engine braking force, but the engine braking force (i.e., deceleration of the model vehicle) decreases gradually. In this situation, therefore, the motor 1 is operated as a generator in such a manner as to reduce the regenerative braking force (i.e., negative torque) gradually so as to imitate such behavior of the model vehicle. Specifically, the motor 1 is operated in such a manner to generate a large regenerative braking force and then reduce the regenerative braking force at a predetermined rate. Consequently, a change rate of the motor torque is increased and hence a charging amount of the electric storage device 3 is increased. Nonetheless, the upper limit value of the change rate of the motor torque has already been increased from the predetermined value $\beta 1$ to another predetermined value $\beta 2$. Therefore, the motor 1 is allowed to generate the regenerative braking force without restriction so that the vehicle Ve may be decelerated to imitate the behavior of the model vehicle.

In the model vehicle, if the clutch pedal is depressed to a deepest position so that the clutch is disengaged completely, the engine is disconnected from the drive wheels and the engine braking force is no longer applied to the model vehicle. In this situation, therefore, the torque of the motor 1 is reduced to zero when the clutch pedal 18 is depressed to a deepest position at point t4 so as to imitate the behavior of the model vehicle. Consequently, a generation of the regenerative braking force is terminated, that is, the control of the motor 1 to imitate the behavior of the model vehicle is temporarily terminated. In this situation, therefore, a reduction of the regulation of the change rate of the motor torque is terminated, and the upper limit value of the change rate of the motor torque is reduced from $\beta 2$ to $\beta 1$.

When the driving torque or the braking torque applied to the front wheels 2 is thus cancelled, the shift lever 17 is moved from the 1st position to the 2nd position via the neutral position from point t5 to point t6. In this situation, therefore, the virtual gear stage is shifted from the first stage (1) to the neutral stage (N) at point t5, and further shifted from the neutral position to the second stage (2) at point t6.

Then, at point t7, the clutch pedal 18 is returned, and the accelerator pedal 12 is depressed so that the output torque of the motor 1 is increased gradually with an increase in depression of the motor 1. In this situation, if the clutch pedal 18 is returned at a high speed or the accelerator pedal 12 is depressed at a high speed, it is necessary to increase the output torque of the motor 1 rapidly. For this purpose, at point t7, the upper limit value of the change rate of the motor torque is increased again from the predetermined value β1 to another predetermined value β2. That is, the regulation of the change rate of the motor torque is reduced at point t7.

Such virtual engagement of the clutch is continued until the clutch pedal 18 is returned completely to the initial position at point t8. Therefore, the upper limit value of the change rate of the motor torque is still maintained to another predetermined value β2 at point t8.

As described, when the clutch is engaged in the model vehicle, the model vehicle would jolt back and forth due to change in the driving torque applied to the drive wheels, in accordance with a speed ratio and a position of the accelerator pedal after the completion of shifting operation. In order to imitate such jolting motion of the model vehicle, the output torque of the motor 1 is increased gradually while reducing and increasing repeatedly after point t8. A band of fluctuation and a fluctuation cycle of the output torque of the motor 1 in this situation may be simulated based on the specifications of the model vehicle, or based on data measured in the model vehicle. Such jolting motion of the model vehicle will converge eventually, and hence the fluctuation of the output torque of the motor 1 is reduced gradually to imitate the conversion of the jolting motion. In this situation, therefore, the load on the electric storage device 3 to fluctuate the output torque of the electric storage device 3 is reduced gradually, and the upper limit value of the change rate of the motor torque is reduced again from another predetermined value β2 to the predetermined value β1 when the load on the electric storage device 3 is no longer expected to exceed the upper limit value. Specifically, the upper limit value of the change rate of the motor torque is reduced again from β2 to β1 at point t9 after the predetermined seconds t (employed at step S4 of the routine shown in FIG. 3) from the completion of the virtual manual shifting. Consequently, the reduction in the regulation of the change rate of the motor torque is terminated at point t9.

In a case that the driver intends to complete the virtual manual shifting promptly without dropping the driving torque significantly, the driver will start the virtual manual shifting by depressing the clutch pedal 18 while depressing the accelerator pedal 12 to a certain position. In FIG. 4, changes in a position of the accelerator pedal 12 and the output torque of the motor 1 in this case are indicated by dashed curves. In this case, when the clutch pedal 18 is depressed at point t3, the accelerator pedal 12 is still being depressed. Then, the accelerator pedal 12 is returned at point t10 while the clutch pedal 18 is being depressed.

In this case, a length of time from point t10 at which the accelerator pedal 12 is started to be returned to point t4 at which the clutch pedal 18 is returned completely to the initial position is rather short, and the torque of the motor 1 is reduced to zero during the above-mentioned period from point t10 to point t4. Thus, the output torque of the motor 1 is changed significantly and hence the load on the electric storage device 3 is increased. Nonetheless, the regulation of the input/output power to/from the electric storage device 3 has already been reduced to increase the upper limit value of the change rate of the motor torque when the clutch pedal 18 was depressed. In this case, therefore, the motor 1 is also allowed to change the output torque promptly and significantly to imitate the behavior of the model vehicle.

As a result of increasing the upper limit value of the change rate of the motor torque, the load on the electric storage device 3 would be increased. However, the clutch pedal 18 is depressed only for a short period of time, and hence the electric storage device 3 is subjected to a high load only for a short period of time. That is, a temperature rise in the electric storage device 3 or the inverter 10 will be terminated within such short period of time, and hence the electric storage device 3 will not be damaged severely. In other words, the damage on the electric storage device 3 may be limited by adjusting the regulation level to protect the electric storage device 3.

Here will be explained a change in the output torque of the motor 1 in a case that the regulation of the input/output power to/from the electric storage device 3 is not reduced during execution of the virtual manual shifting. For example, if the regulation level to protect the electric storage device 3 is maintained to the high level, the output torque of the motor 1 may not be changed abruptly and significantly during execution of the virtual manual shifting to imitate the behavior of the mode vehicle. In this case, specifically, the output torque of the motor 1 may not be reduced when the virtual engine speed Ne is raised to the reference speed α or when the accelerator pedal 12 is returned, and as indicated by the dashed-dotted curve in FIG. 4, the torque is continuously generated by the motor 1. That is, although the driver expects to eliminate the driving torque during execution of the virtual manual shifting, the vehicle Ve will be propelled continuously by the torque generated by the motor 1 contrary to the driver's intentions. However, according to the exemplary embodiment of the present disclosure, the regulation of the input/output power to/from the electric storage device 3 is reduced during execution of the virtual manual shifting. According to the exemplary embodiment of the present disclosure, therefore, the vehicle Ve is allowed to imitate the behavior of the model vehicle during execution of the virtual manual shifting in line with the driver's intention.

The running condition of the vehicle Ve varies widely depending on traffic conditions and road surface conditions, and hence the virtual manual shifting may be executed in a condition where a large driving force is required. In this situation, the system including the electric storage device 3, the inverter 10, and the motor 1 is subjected to a large load, and hence the system is protected on a preferential basis by suppressing the load applied to the system, even during the execution of the virtual manual shifting. Specifically, in the case that the condition to protect the system is satisfied so that the answer of step S5 of the routine shown in FIG. 3 is YES, the high regulation level is maintained without reducing the regulation. In this case, therefore, the change rate of the output torque of the motor 1 or the input/output power to/from the electric storage device 3 is restricted within the upper limit value. Consequently, as indicated by the two-dotted-dashed curve in FIG. 4, the output torque of the motor 1 is changed linearly. In this situation, the system can be protected to limit damage thereof, but the vehicle Ve is not allowed to imitate the above-explained longitudinal jolting motion of the model vehicle. However, such jolting motion of the model vehicle is caused inevitably, and the driver of the vehicle Ve is not expected such jolting motion after the completion of the virtual manual shifting. Therefore, the driver will not feel a gap in the behavior of the vehicle Ve even if the vehicle Ve does not jolt after the completion of the virtual manual shifting. Thus, according to the exemplary embodiment of the present disclosure, the vehicle Ve is allowed to imitate the behavior of the model vehicle during execution of the virtual manual shifting, while protecting the system including electric storage device 3.

Although the above exemplary embodiment of the present disclosure has been described, it will be understood by those skilled in the art that the present disclosure should not be limited to the described exemplary embodiments, and various changes and modifications can be made within the scope of the present disclosure. For example, the virtual manual transmission system according to the exemplary embodiment of the present disclosure may also be applied to electric vehicles having a dedicated motor for generating a driving torque and a dedicated generator for regenerating an electric power when decelerating the vehicle. Further, in the vehicle Ve, a manipulating device other than the accelerator pedal 12 may also be employed instead of the accelerator pedal 12, and a manipulating device other than the clutch pedal 18 may also be employed instead of the clutch pedal 18. Furthermore, the virtual speed ratios of the virtual gear stages may also be calculated based on a rotational speed of another rotary member corresponding to a speed of the vehicle Ve, instead of the rotational speed of the propeller shaft 6.

As described, the electric vehicles to which the virtual manual transmission system according to the exemplary embodiment of the present disclosure is applied do not have a manual transmission, and hence it may be difficult to establish fixed virtual gear stage as the gear stages established by the manual transmission. In the exemplary embodiment of the present disclosure, therefore, the definition of the "mode" includes the virtual gear stage, the virtual speed ratio, and a control to propel the electric vehicle at a speed ratio within a predetermined range. In addition, the upper limit value may be multiplied by a predetermined relaxation coefficient set in accordance with a temperature or an SOC level of the electric storage device 3. Otherwise, the upper limit value may also be changed depending on a virtual engine speed immediately before the commencement of the virtual manual shifting.

What is claimed is:

1. A virtual manual transmission system for an electric vehicle, comprising:
   an electric motor that serves as a prime mover;
   an accelerator device that is operated by a driver to control an output torque of the electric motor;
   an electric storage device that is connected to the electric motor, wherein at least one of a change rate of the output torque of the electric motor and an input/output power to/from the electric storage device may be regulated;
   a clutch device that is operated by the driver to transmit a torque between the electric motor and a pair of drive wheels, and to interrupt torque transmission between the electric motor and the drive wheels;
   a shifting device that is operated by the driver to select a mode determining a relation between the output torque of the electric motor and a driving torque delivered to the drive wheels; and
   a controller that controls the output torque of the electric motor, wherein the controller is configured to:
   change the output torque of the electric motor based on a detection signal representing an execution of a virtual manual shifting including an operation of the clutch device to allow or interrupt torque transmission between the electric motor and the drive wheels, an operation of the accelerator device to change the output torque of the electric motor executed in connection with the operation of the clutch device, and an operation of the shifting device to select the mode;
   change an upper limit value of the at least one of the change rate of the output torque of the electric motor and the input/output power to/from the electric storage device, so as to reduce a regulation on the change rate of the output torque of the electric motor or the input/output power to/from the electric storage device; and
   reduce the regulation for a predetermined period of time after completion of the operation of the clutch device to interrupt torque transmission between the electric motor and the drive wheels, or to allow torque transmission between the electric motor and the drive wheels.

2. A virtual manual transmission system for an electric vehicle, comprising:
   an electric motor that serves as a prime mover;
   an accelerator device that is operated by a driver to control an output torque of the electric motor;
   an electric storage device that is connected to the electric motor, wherein at least one of a change rate of the output torque of the electric motor and an input/output power to/from the electric storage device may be regulated;
   a clutch device that is operated by the driver to transmit a torque between the electric motor and a pair of drive wheels, and to interrupt torque transmission between the electric motor and the drive wheels;
   a shifting device that is operated by the driver to select a mode determining a relation between the output torque of the electric motor and a driving torque delivered to the drive wheels; and
   a controller that controls the output torque of the electric motor, wherein the controller is configured to:
   change the output torque of the electric motor based on a detection signal representing an execution of a virtual manual shifting including an operation of the clutch device to allow or interrupt torque transmission between the electric motor and the drive wheels, an operation of the accelerator device to change the output torque of the electric motor executed in connection with the operation of the clutch device, and an operation of the shifting device to select the mode;
   change an upper limit value of the at least one of the change rate of the output torque of the electric motor and the input/output power to/from the electric storage device, so as to reduce a regulation on the change rate of the output torque of the electric motor or the input/output power to/from the electric storage device;
   determine a satisfaction of a condition to protect the electric motor or the electric storage device; and
   restrict reduction of the regulation upon satisfaction of the condition to protect the electric motor or the electric storage device.

3. The virtual manual transmission system for the electric vehicle as claimed in claim 1, wherein the controller is further configured to:
   determine a satisfaction of a condition to protect the electric motor or the electric storage device; and restrict reduction of the regulation upon satisfaction of the condition to protect the electric motor or the electric storage device.

4. The virtual manual transmission system for the electric vehicle as claimed in claim 2, wherein the controller is further configured to change the upper limit value to reduce the regulation on a preferential basis in a case of operating the clutch device to interrupt torque transmission between the electric motor and the drive wheels, compared to a case of operating the clutch device to allow torque transmission between the electric motor and the drive wheels.

5. The virtual manual transmission system for the electric vehicle as claimed in claim 3, wherein the controller is further configured to change the upper limit value to reduce the regulation on a preferential basis in a case of operating the clutch device to interrupt torque transmission between the electric motor and the drive wheels, compared to a case of operating the clutch device to allow torque transmission between the electric motor and the drive wheels.

* * * * *